(12) United States Patent
Dong

(10) Patent No.: US 10,825,130 B2
(45) Date of Patent: *Nov. 3, 2020

(54) METHOD AND APPARATUS FOR DISPLAYING PICTURE CONTENT IN APPLICATION, AND STORAGE MEDIUM

(71) Applicant: Tencent Technology (Shenzhen) Company Limited, Guangdong (CN)

(72) Inventor: Kai Dong, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/821,108

(22) Filed: Mar. 17, 2020

(65) Prior Publication Data

US 2020/0219226 A1 Jul. 9, 2020

Related U.S. Application Data

(63) Continuation of application No. 15/964,650, filed on Apr. 27, 2018, now Pat. No. 10,636,113, which is a
(Continued)

(30) Foreign Application Priority Data

Jun. 1, 2016 (CN) .......................... 2016 1 0383178

(51) Int. Cl.
*G06T 1/60* (2006.01)
*G09G 5/02* (2006.01)
(Continued)

(52) U.S. Cl.
CPC ................. *G06T 1/60* (2013.01); *G09G 5/02* (2013.01); *G09G 5/391* (2013.01); *G09G 5/395* (2013.01);
(Continued)

(58) Field of Classification Search
CPC ....................................................... G09G 5/02
See application file for complete search history.

(56) References Cited

U.S. PATENT DOCUMENTS

2005/0207737 A1* 9/2005 Seo ........................ G11B 20/12
386/241
2010/0247075 A1* 9/2010 Nakata ............... H04N 5/44513
386/244

FOREIGN PATENT DOCUMENTS

CN 1448841 A 10/2003
CN 104063871 A 9/2014
(Continued)

OTHER PUBLICATIONS

International Search Report and Written Opinion dated Aug. 16, 2017 for PCT Application No. PCT/CN2017/085469, 21 pages.
(Continued)

*Primary Examiner* — Jitesh Patel
(74) *Attorney, Agent, or Firm* — Brinks Gilson & Lione

(57) ABSTRACT

The present disclosure describes a method, an apparatus, and a non-transitory computer readable storage medium for displaying pictures in an application. The method includes obtaining original picture information and performing an indexing operation on the original picture information to obtain an indexed object. The method also includes performing a de-indexing operation on the indexed object, and establishing a bitmap object of an index color format according to a color table and a pixel buffer in the indexed object. The method further includes displaying the picture in the application by using the bitmap object. By using the present disclosure, a memory occupation rate in an electronic device can be effectively reduced, thereby solving the existing problem and improving the functionality and stability of the application in the electronic device.

20 Claims, 5 Drawing Sheets

Related U.S. Application Data continuation of application No. PCT/CN2017/085469, filed on May 23, 2017.

(51) Int. Cl.
*G09G 5/391* (2006.01)
*G09G 5/395* (2006.01)
*G09G 5/39* (2006.01)

(52) U.S. Cl.
CPC ........... *G09G 5/39* (2013.01); *G09G 2340/02* (2013.01); *G09G 2380/14* (2013.01)

(56) References Cited

FOREIGN PATENT DOCUMENTS

| | | |
|---|---|---|
| CN | 104112100 A | 10/2014 |
| CN | 104268229 A | 1/2015 |
| CN | 104461745 A | 3/2015 |
| CN | 104486578 A | 4/2015 |
| CN | 104965709 A | 10/2015 |
| CN | 105373471 A | 3/2016 |
| CN | 105430496 A | 3/2016 |
| CN | 106056530 A | 10/2016 |
| KR | 10-2005-0092917 A | 9/2005 |

OTHER PUBLICATIONS

Office Action dated Apr. 19, 2019 for Chinese Application No. 201610383178.8, 11 pages.

\* cited by examiner

METHOD AND APPARATUS FOR DISPLAYING PICTURE CONTENT IN APPLICATION, AND STORAGE MEDIUM

RELATED APPLICATION

This application is a continuation of U.S. application Ser. No. 15/964,650 filed on Apr. 27, 2018, which is a continuation application of PCT Patent Application No. PCT/CN2017/085469, filed on May 23, 2017, which claims priority to Chinese Patent Application No. 201610383178.8 filed on Jun. 1, 2016, all of which are incorporated herein by reference in their entireties.

FIELD OF THE TECHNOLOGY

The present disclosure relates to the field of computer application technologies, and in particular, to a method and an apparatus for displaying picture content in an application.

BACKGROUND OF THE DISCLOSURE

With the gradual development of computer application technologies, various electronic devices are increasingly popular, and applications based on electronic devices, such as ebook readers and browsers, are also increasingly rich. These applications usually need to display pictures inside the application. For example, a user reads an ebook or browses a web page by displaying picture content.

However, currently, picture content in an application is usually displayed by establishing a bitmap object of a true color format. That is, in the established bitmap object, the picture content is displayed by using a color of each pixel in a pixel buffer. However, each pixel of the pixel buffer in the bitmap object of the true color format needs to occupy a storage space of at least 16 bits.

Therefore, in a scenario in which there is a relatively large number of displayed pictures or the sizes of displayed pictures are relatively large, the memory of an electronic device may be exhausted easily, leading to the occurrence of system errors. In particular, this problem may be amplified in a mobile terminal such as a smartphone with a limited memory. Consequently, the function and the stability of an application are affected.

SUMMARY

To address the problem and, more particularly, to improve picture displaying technology in electronic devices, an improved method for displaying picture content in an application is described. The disclosed method can effectively reduce a memory occupation rate in an electronic device, thereby improving the functionality and stability of an application in the electronic device.

In addition, it is also necessary to provide an apparatus for displaying picture content in an application. The apparatus can effectively reduce a memory occupation rate in an electronic device, thereby improving the functionality and stability of an application in the electronic device.

To resolve the foregoing technical problems, technical solutions used in the present disclosure are summarized below.

A method for displaying picture content in an application. The method includes obtaining, by a processor, original picture information of a picture. The processor is communication with a memory and a display screen. The method includes performing, by the processor, an indexing operation on the original picture information to obtain an indexed object. The method also includes performing, by the processor, a de-indexing operation on the indexed object, and establishing a bitmap object of an index color format according to a color table and a pixel buffer in the indexed object. The method further includes displaying, by the display screen, the picture in an application by using the bitmap object.

An apparatus for displaying picture content in an application. The apparatus includes a memory storing instructions and a processor in communication with the memory. When the processor executes the instructions, the processor is configured to cause the apparatus to obtain original picture information of a picture, and perform an indexing operation on the original picture information to obtain an indexed object. When the processor executes the instructions, the processor is also configured to cause the apparatus to perform a de-indexing operation on the indexed object, and establish a bitmap object of an index color format according to a color table and a pixel buffer in the indexed object. When the processor executes the instructions, the processor is further configured to cause the apparatus to display the picture in an application by using the bitmap object.

A non-transitory computer readable storage medium stores instructions. The instructions, when executed by a processor, cause the processor to perform obtaining original picture information of a picture and performing an indexing operation on the original picture information to obtain an indexed object. The instructions, when executed by a processor, also cause the processor to perform performing a de-indexing operation on the indexed object, and establishing a bitmap object of an index color format according to a color table and a pixel buffer in the indexed object. The instructions, when executed by a processor, further cause the processor to perform displaying the picture in an application by using the bitmap object.

Compared with the existing technology, the present disclosure has the following beneficial effects.

In an application, picture content is displayed by establishing a bitmap object of an index color format. The bitmap object of the index color format is established according to a color table and a pixel buffer in a serialized object by means of serialization and deserialization processing. Each pixel in the bitmap object of the index color format occupies a storage space of only 8 bits, which is ½ or even ¼ of a storage space occupied by each pixel in a bitmap object of a true color format for a displayed picture of a same size. Therefore, a memory occupation rate in an electronic device is effectively reduced and the probability of system error occurrence is significantly reduced, thereby improving the functionality and stability of an application in the electronic device.

DESCRIPTION OF EMBODIMENTS

Figure 1:
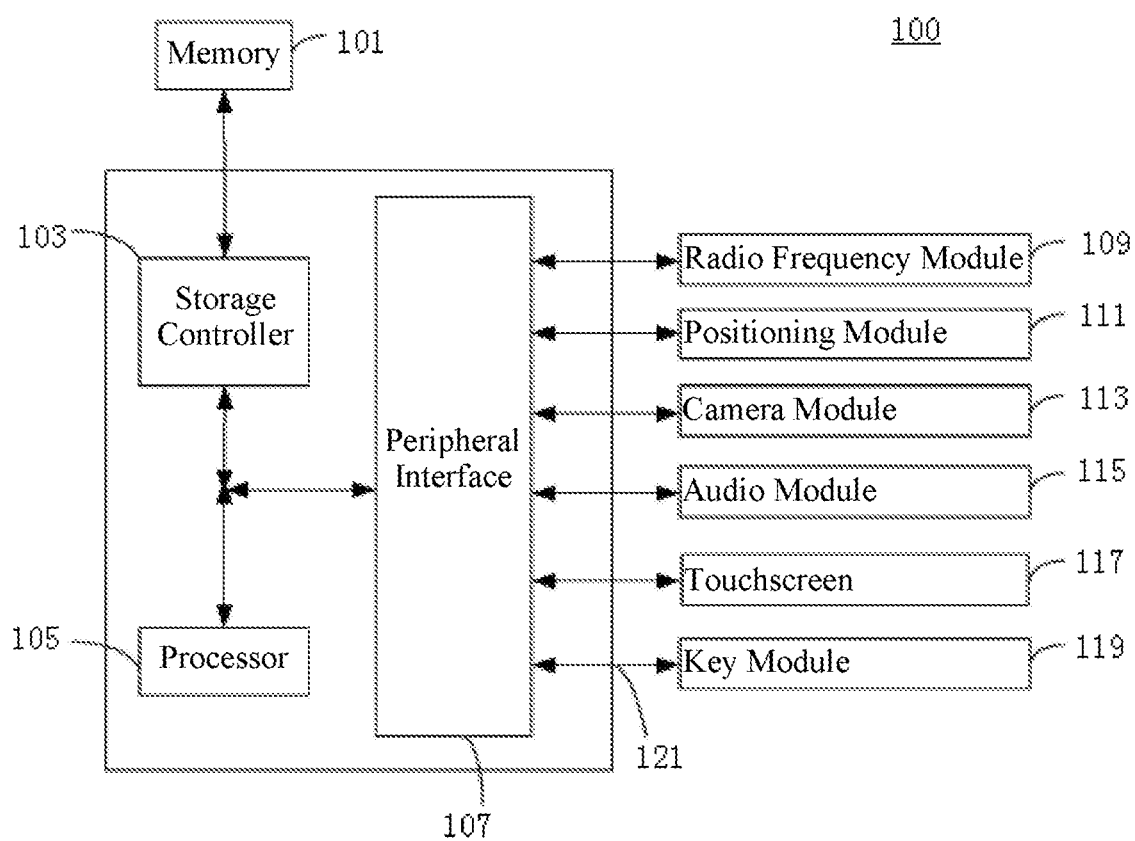
FIG. 1 is a schematic structural diagram of an electronic device according to an embodiment of the present disclosure.

Typical implementations reflecting features and advantages of the present disclosure will be described in the following descriptions. It should be understood that the present disclosure can have various changes in different implementations, and none of the changes departs from the scope of the present disclosure, and descriptions and figures therein are essentially for descriptive purposes, and are not intended to limit the present disclosure.

As stated above, a bitmap object may be used to display picture content in an application. A color format of the bitmap object may be, but not limited to, a true color format, an Alpha8 format, and an index color format.

The true color format indicates that a color of each pixel is described by using optical strengths of three primary colors: red (R), green (G), and blue (B). The color of each pixel may be described further by using a transparency (A). The true color format may include ARGB8888, ARGB4444, and RGB565. In any one of the true color formats, each pixel of a pixel buffer in a bitmap object of the color format occupies a storage space of at least 16 bits. For example, in the ARGB8888 format, red, green, blue, and transparency of each pixel are respectively represented by using 8-bit unsigned integers. Correspondingly, each pixel of a pixel buffer in a bitmap object of the ARGB8888 format occupies a 32-bit storage space.

The Alpha8 format is usually used as a mask during picture synthesis or picture edition, and can describe only transparency of each pixel. Each pixel of a pixel buffer in a bitmap object of the color format occupies a storage space of only 8 bits.

The index color format indicates that a color of each pixel is described by means of color table lookup. The color table is formed by representative no more than 256 colors in sample pictures. Each pixel of a pixel buffer in a bitmap object of the color format occupies a storage space of only 8 bits.

In view of the above, only the index color format in the color formats of a bitmap object not only can be used to describe the color of each pixel, but also occupies a relatively small storage space.

However, in conventional technologies, a plurality of requirements is set for establishment of a bitmap object of an index color format. That is, a bitmap object of an index color format can be established only when an input picture has transparency and has an index color format and an output picture has an RGB565 format. However, in actual application, a color format of an input picture is not or even cannot be specified in most cases. Even if the color format of the input picture is manually specified, the input picture still cannot be made to meet the requirement of having transparency. In addition, it is intrinsically contradictory between that the input picture has transparency and that the output picture has the RGB565 format without transparency. Thus, the probability that the bitmap object of the index color format is established is approximately zero.

Further, it is more difficult to achieve the goal of reducing the storage space by establishing a bitmap object of an index color format and displaying picture content in an application.

Therefore, to effectively reduce an occupied storage space during displaying pictures in an application, a method for displaying picture content in the application is provided. According to the method, picture content is displayed by establishing a bitmap object of an index color format. The method may rely on a computer program, and the computer program may run on an electronic device.

Referring to FIG. 1, FIG. 1 is a schematic structural diagram of an electronic device 100 according to an embodiment of the present disclosure. The electronic device 100 may be a smartphone, a tablet computer, a palmtop computer, a computer, a notebook computer, or another electronic device that can run operating systems such as an Android system, an IOS system, and a Windows system.

It should be noted that the electronic device 100 is merely an example adapted to the present disclosure, and cannot be considered as providing any limitation to a use range of the present disclosure. The electronic device 100 cannot be explained as needing to reply on or needing to have one or more components in the exemplary electronic device 100 shown in FIG. 1.

As shown in FIG. 1, the electronic device 100 includes a memory 101, a storage controller 103, one or more (only one is shown in the figure) processors 105, a peripheral interface 107, a radio frequency module 109, a positioning module 111, a camera module 113, an audio module 115, a touchscreen 117, and a key module 119. These components communicate with each other by using one or more communications buses/signal lines 121.

It may be understood that the structure shown in FIG. 1 is only for the purpose of illustration, and the electronic device 100 may alternatively include more or fewer components than those shown in FIG. 1, or have components different from those shown in FIG. 1. The components shown in FIG. 1 may be implemented by using hardware, software, or a combination thereof.

The memory 101 may be configured to store a software program and module, such as a program instruction and module corresponding to a method and an apparatus for displaying a desktop tool in the embodiments of the present disclosure. The processor 105 executes various functions and performs data processing by running the software program stored in the memory 101, thereby implementing the following method for displaying picture content in an application running in the electronic device 100.

The memory 101 is used as a carrier for resource storage, and may be a random storage medium such as a high speed random access memory, a non-volatile memory such as one or more magnetic storage apparatuses, a flash memory, or another solid-state memory. The storage manner may be transient storage or permanent storage.

The peripheral interface 107 may include at least one wired or wireless network interface, at least one series-parallel conversion interface, at least one input and output interface, at least one USB interface, and the like, and is configured to couple various external input/output apparatuses to the memory 101 and the processor 105, to implement communication with various external input/output apparatuses.

The radio frequency module 109 is configured to receive and send an electromagnetic wave, and implement mutual conversion between the electromagnetic wave and an electric signal, so as to communicate with another device by using a communications network. The communications network includes a cellular telephone network, a wireless local area network, or a metropolitan area network. The communications network may use various communications standards, protocols and technologies.

The positioning module 111 is configured to obtain a current geographical location in which the electronic device 100 is located. The positioning module 111 includes, for example, but is not limited to, a Global Positioning System (GPS) or a positioning technology based on a wireless local area network or a mobile communications network.

The camera module 113 is configured to capture a picture or a video. The captured picture or video may be stored in the memory 101, or may be sent by using the radio frequency module 109.

The audio module 115 provides an audio interface to a user, and may include one or more microphone interfaces, one or more speaker interfaces, and one or more earphone interfaces. Interaction of audio data is performed with another device by using the audio interface. Audio data may be stored in the memory 101, or may be sent by using the radio frequency module 109.

The touchscreen 117 provides an input and output interface between the electronic device 100 and a user. Specifically, the user may perform an input operation by using the touchscreen 117, such as a gesture operation like clicking, touching, and sliding, so that the electronic device responds to the input operation. The electronic device 100 displays and outputs output content formed by any form of text, pictures, or videos or a combination thereof to the user by using the touchscreen 117.

The key module 119 includes at least one key, for providing an interface for the user to input information to the electronic device 100. The user may press different keys to enable the mobile terminal 100 to perform different functions. For example, a volume key may be used for the user to adjust the volume of sound played by the electronic device 100.

In addition, the present disclosure can also be implemented by using a hardware circuit or a combination of a hardware circuit and a software instruction. Therefore, implementation of the present disclosure is not limited to any specific hardware circuit, software, and a combination thereof.

Figure 2:
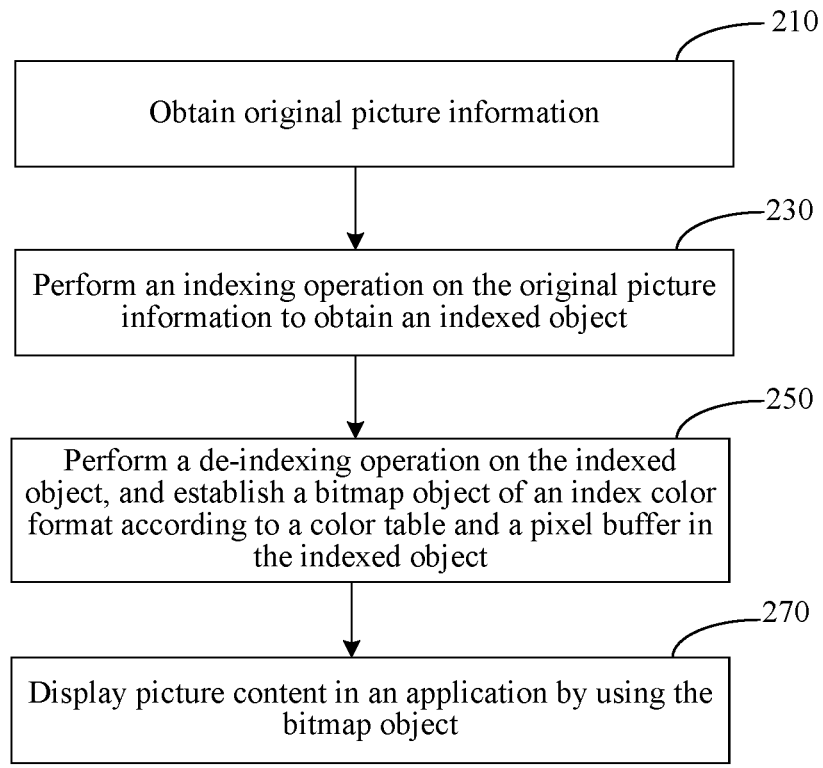
FIG. 2 is a flowchart of a method for displaying picture content in an application according to an embodiment of the present disclosure.

Referring to FIG. 2, in an embodiment, a method for displaying picture content in an application includes the following steps:

Step 210: Obtain original picture information.

To display picture content in an application, the original picture information needs to be obtained. That is, the obtained original picture information will be used for subsequent display of the picture content. The original picture information may be obtained by means of preconstruction or picture decoding.

The original picture information reflects basic information about a picture. For example, the original picture information may include a color format, a width, a height, a number of row bytes, a pixel density, a color table, a pixel buffer, and the like of the picture.

Step 230: Perform an indexing operation on the original picture information to obtain an indexed object.

The indexed object is a byte sequence for storage. The original picture information may be stored into a corresponding storage space by using the byte sequence, so that the original picture information is re-obtained in subsequent use by reading it in the storage space or by means of a de-indexing operation.

Correspondingly, the indexing operation is to convert the original picture information into a byte sequence. Assuming that the original picture information of the picture includes at least a color table and a pixel buffer of the picture, the indexing operation is to convert the color table and the pixel buffer into byte sequences.

For example, when a color format of the picture is a true color format, the pixel buffer stores a color value corresponding to a color of each pixel. The pixel buffer may be represented by a one-dimensional array. Variables of a same type in the one-dimensional array represent color values. Positions of variables in the one-dimensional array represent sequence numbers of pixels. The color of each pixel can be learned by using the pixel buffer. Therefore, converting the pixel buffer into the byte sequence is substantively extracting color values from the one-dimensional array for indexing, and storing same into the indexed object.

In one embodiment, an indexed object may be represented by using a Parcel object.

Step 250: Perform a de-indexing operation on the indexed object, and establish a bitmap object of an index color format according to the color table and the pixel buffer in the indexed object.

In this embodiment, a bitmap object is constructed by performing de-indexing operation on the indexed object, so that the original picture information is represented by the valid bitmap object.

Because the indexed object is obtained by performing an indexing operation on the original picture information, the indexed object stores the original picture information. During the de-indexing operation, a valid bitmap object including the original picture information can be recovered by calling a de-indexing operation interface and importing the indexed object as a parameter.

In one embodiment, the color format, included in the original picture information, of a picture may be an index color format, and the original picture information may include a color table and a pixel buffer of the picture. The color table may be represented by a one-dimensional array, and stores several color values in sequence. The position of each color value in the color table is represented by using an index value. The pixel buffer stores the index value corresponding to the color of each pixel, and the color of each pixel may be determined by means of looking up the color table according to the index value.

Correspondingly, an indexing operation is performed on the original picture information, so that the indexed object stores a color format, a color table, a pixel buffer in the original picture information. Therefore, according to a de-indexing operation, a bitmap object of an index color format may be established according to the color table and the pixel buffer in the indexed object.

It should be noted that the color table and the pixel buffer in the indexed object are both represented in a form of a byte sequence.

Step 270: Display picture content in an application by using the bitmap object. After the bitmap object of the index color format is established, the picture content in an application can be displayed by using the bitmap object.

For example, in an application scenario, the application is an ebook reader. Each page in the ebook reader has a size approximately the same as a screen size provided by the device. Therefore, assuming that the resolution of a screen is 1280×720, when a page of the ebook reader is displayed by using a bitmap object of an ARGB8888 format, a storage space that all pixels in one page need to occupy is 1280×720×4=3686400 bytes. By analogy, a higher resolution indicates a larger occupied memory. For example, in a 1080P device, one page occupies an 8-MB memory. However, after the page is displayed by using a bitmap object of an index color format, a memory occupation rate is reduced to ¼ of the original memory occupation rate.

By means of the foregoing process, picture content is displayed by using a bitmap object of an index color format, and therefore, a storage space occupied by each pixel is reduced to only 1 byte, so that the storage space occupied in the process of displaying the picture content is effectively reduced, the memory occupation rate in an electronic device is reduced, and the probability of application crash caused by insufficient memory is greatly reduced, thereby solving the problem and improving the functionality and stability of an application in the electronic device.

In another embodiment, the application may still be an ebook reader. The ebook reader performs, by using a typesetting rendering engine carried in the ebook reader, typesetting rendering on picture content to be displayed by the ebook reader, and then the picture content is cached by using an established bitmap object, so as to quickly display the picture content for a user to read.

By means of the foregoing process, a typical processing manner of reducing a storage space with longer time duration is implemented. That is, the bitmap object pre-stores a typesetting rendering result (such as a current page and several front and rear pages of an ebook), so as to improve the efficiency of displaying the picture content in the application, thereby facilitating generating an animated effect of turning page in the ebook reader.

In an embodiment, step 210 includes the following step:

obtaining specified original picture information by means of picture information construction performed in advance. In another embodiment, step 210 may include constructing picture information in advance and obtaining the original picture information according to the constructed picture information.

To display the picture content in the application, picture information is pre-constructed for use during subsequent establishment of the bitmap object.

The pre-constructed picture information is preset according to basic information about an expected picture. For example, if a color format of the expected picture is an index color format, the color format, included in the pre-constructed picture information, of the picture is set to an index color format.

Therefore, when the bitmap object is established, original picture information conforming to specification is obtained from the pre-constructed picture information by means of the further specification.

Figure 3:
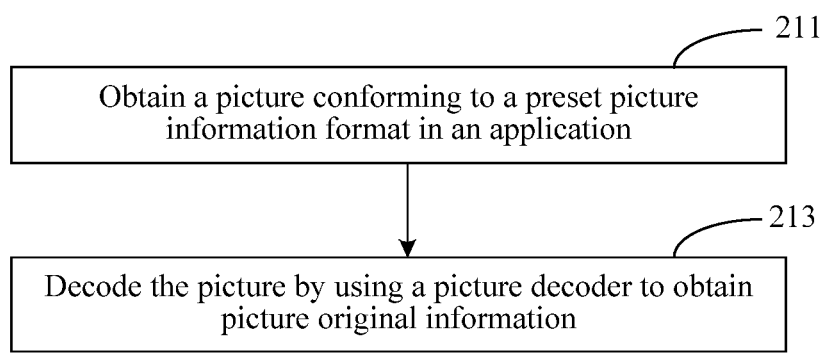
FIG. 3 is a flowchart of a method for obtaining original picture information in FIG. 2.

Referring to FIG. 3, in an embodiment, step 210 includes the following steps:

Step 211: Obtain a picture conforming to a preset picture information format in the application.

To obtain the original picture information, in this embodiment, a picture needs to be obtained, and the obtained picture conforms to the preset picture information format in the application.

In one embodiment, the application may be an ebook reader. A picture in the ebook reader is each page of an ebook. Correspondingly, a preset picture information format in the ebook reader may be page information about the page. Therefore, the obtained picture is any page, conforming to the page information about the page, in the ebook.

It should be understood that obtaining the picture according to the preset picture information format in the application facilitates more accurate display of the picture content in the application in the subsequent process of displaying the picture content.

Step 213: Decode the picture by using a picture decoder to obtain the original picture information.

Figure 4:
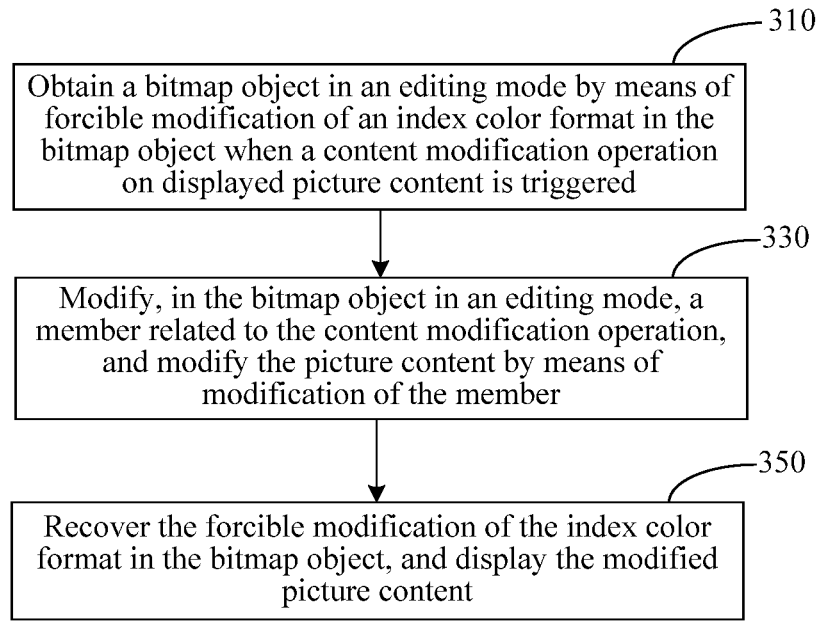
FIG. 4 is a flowchart of a method for displaying picture content in an application according to another embodiment.

Referring to FIG. 4, in an embodiment, the foregoing method further includes the following steps:

Step 310: When a content modification operation on the displayed picture content is triggered, obtain a bitmap object in an editing mode by means of forcible modification of the index color format in the bitmap object.

To modify the displayed picture content, the content modification operation triggered in the displayed picture content will be monitored.

In one embodiment, the application may be an ebook reader. In a page displayed by the ebook reader, a user may modify a font size of the page by sliding a font size adjustment key displayed in the ebook reader, or the user may modify a background of the page by tapping a reading mode selection key displayed in the ebook reader.

When the content modification operation on the displayed picture content is triggered, the displayed picture content is modified by obtaining the bitmap object in an editing mode. Obtaining the bitmap object in the editing mode is completed by means of the forcible modification of the index color format in the bitmap object.

Step 330: Modify, in the bitmap object in the editing mode, a member related to the content modification operation, and modify the picture content by means of modification of the member. In one embodiment, the member may be a parameter or a setting of the bitmap object related to the content modification operation.

As stated above, the bitmap object established by means of an indexing operation and a de-indexing operation can be used to represent the original picture information. It should be understood that members of the bitmap object correspond to the original picture information. In other words, the members of the bitmap object of the index color format may include at least one of a color format, the width, the height, the number of row bytes, the pixel density, a color table, a pixel buffer, or the like of the picture.

The bitmap object in the editing mode indicates that the members of the bitmap object can be modified. On such basis, to modify the picture content, the members related to the content modification operation are modified.

For example, if the content modification operation is a color modification operation, a modified member of the bitmap object is an index value corresponding to a color of each pixel in the pixel buffer. If the content modification operation is a font size modification operation, the modified member of the bitmap object is the number of row bytes.

In an application scenario, the application is an ebook reader. A user modifies a background of a page by tapping a reading mode selection key displayed in the ebook reader. Correspondingly, index values in a pixel buffer are modified in the ebook reader. If a reading mode selected by the user is a night mode, because a color value corresponding to an index value 0 in a color table is (0, 0, 0) (that is, black), in response to a color modification operation, an index value in the pixel buffer is modified as 0. That is, the index value changes and the color value keeps unchanged, so that the background of the page is modified as black.

In another embodiment, the width, the height, and the pixel density of the picture in the members may be closely related to the size and the pixel density of a screen for displaying the picture content, and usually, may not be modified by means of the content modification operation.

Step 350: Recover the forcible modification of the index color format in the bitmap object, and display the modified picture content.

After modification of the picture content is completed, the forcible modification of the index color format in the bitmap object needs to be recovered. That is, the color format of the bitmap object is recovered to the index color format, so that the modified picture content is displayed by using the bitmap object of the index color format.

By means of the foregoing process, a canvas is established by using the bitmap object of the index color format, and drawing, such as zooming and color changing can be performed, based on an underlying graphic library Skia, on the canvas established by the bitmap object, so as to output modified content to the bitmap object by means of the drawing on the canvas, thereby modifying the picture content. In this way, the drawing performance of the application is improved, and the problem in the existing technology that the displayed picture content cannot be directly modified because the underlying graphic library Skia does not support the bitmap object of the index color format to establish the canvas is resolved.

In addition, by means of the foregoing process, the displayed picture content can be directly modified, so that a same bitmap object can be repeatedly recycled for reuse, to avoid frequency memory allocation and release caused by frequency establishment of the bitmap object, thereby avoiding a system performance bottleneck caused by excessively high occupation of a memory in an electronic device.

Figure 5:
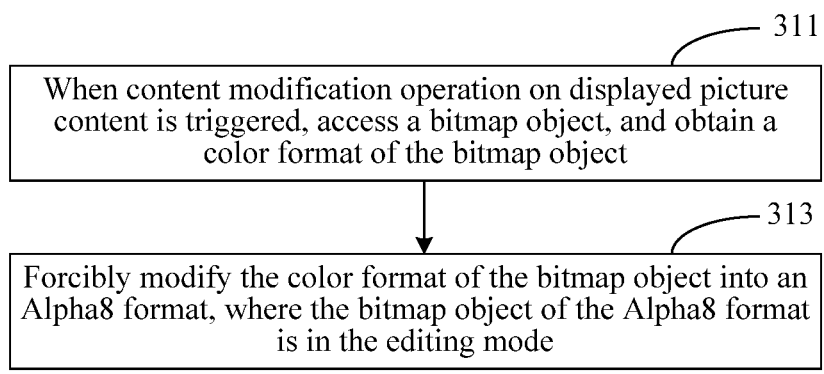
FIG. 5 is a flowchart of method for obtaining a bitmap object in an editing mode by means of forcible modification of an index color format in a bitmap in FIG. 4.

Referring to FIG. 5, in an embodiment, step 310 includes the following steps:

Step 311: When the content modification operation on the displayed picture content is triggered, access the bitmap object, and obtain a color format of the bitmap object.

When the content modification operation on the displayed picture content is triggered, the bitmap object in an editing mode is obtained by means of forcible modification of the index color format in the bitmap object.

Therefore, before the forcible modification of the index color format is performed on the bitmap object, the color format of the bitmap object needs to be obtained, to confirm whether the color format of the bitmap object is the index color format.

Specifically, the bitmap object is accessed, that is, a memory layout of the bitmap object is accessed, to position a memory address of a color format member in the bitmap object. The color format of the bitmap object can be obtained by reading content stored in the memory address.

Step 313: Forcibly modify the color format of the bitmap object into an Alpha8 format, where the bitmap object of the Alpha8 format is in the editing mode.

If the color format of the bitmap object is the index color format, to modify the displayed picture content, the forcible modification of the index color format needs to be performed in the bitmap object.

Further, because a storage space occupied by each pixel of a pixel buffer in a bitmap object of an Alpha8 format is consistent with a storage space occupied by each pixel of a pixel buffer in the bitmap object of the index color format, the color format of the bitmap object is forcibly modified as the Alpha8 format.

As stated above, the Alpha8 format is usually used as a mask during picture synthesis or picture edition. Therefore, the bitmap object of the Alpha8 format is in an editing mode. In this case, the displayed picture content can be directly modified.

After modification of the displayed picture content is completed, the color format of the bitmap object is recovered, so that the recovered bitmap object can still normally display the modified picture content.

In an embodiment, the content modification operation may include a color modification operation. As stated above, the content modification operation may also include the color modification operation and the font size modification operation. The content modification operation may be completed by means of forcible modification of the index color format in the bitmap object. However, in this embodiment, an implementation of responding to a color modification operation based on the bitmap object of the index color format is introduced.

Further, the foregoing method further includes the following step:

when a color modification operation on the displayed picture content is triggered, modifying a color value in a color table of the bitmap object, so that a match color displayed by the picture content conforms with the color modification operation.

In this embodiment, when the color modification operation on the displayed picture content is triggered, to respond to the color modification operation, the color table in the bitmap object needs to be obtained.

Specifically, the bitmap object is accessed, that is, the memory layout of the bitmap object is accessed, to obtain a memory address of a color table member in the bitmap object. The color table in the bitmap object can be obtained by reading the content stored corresponding to the memory address, so as to modify the color value in the color table to modify the match color displayed by the picture content.

In one embodiment, the application may be an ebook reader. A user modifies a background of a page by tapping a reading mode selection key displayed in the ebook reader. Correspondingly, color values in a color table are modified in the ebook reader. A reading mode selected by the user is an eye protection mode. The eye protection mode may include, for example but not limited to, an eye protective green mode. An index value in a pixel buffer is 0, a color value corresponding to the index value 0 in the color table is (255, 255, 255) (that is, white), and a color value corresponding to eye protective green is (0, 255, 0), in response to a color modification operation, the color value corresponding to the index value 0 in the color table is modified from (255, 255, 255) to (0, 255, 0). That is, the color value changes and the index value keeps unchanged, so that the background of the page is modified as eye protective green.

By means of the foregoing process, the match color displayed by the picture content can be directly modified without the forcible modification of the color format of the bitmap object, thereby improving the drawing performance of the application. In addition, different color schemes are implemented by using a same bitmap object, further decreasing the necessary storage size and reducing a memory occupation rate in the electronic device, and resolving the problem in the existing technology that a relatively large memory is occupied because a plurality of bitmap objects needs to be correspondingly established for implementing different color schemes.

Figure 6:
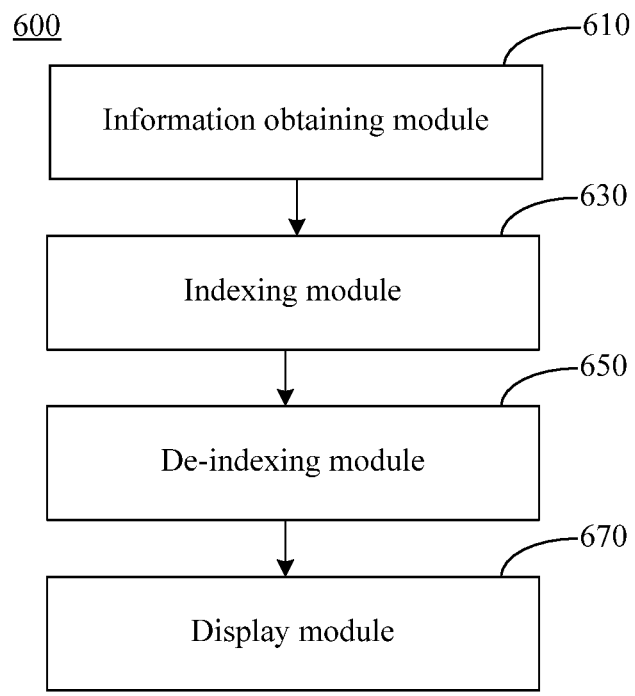
FIG. 6 is a structural block diagram of an apparatus for displaying picture content in an application according to an embodiment.

Referring to FIG. 6, in an embodiment, an apparatus 600 for displaying picture content in an application may include an information obtaining module 610, an indexing module 630, a de-indexing module 650, and a display module 670.

The information obtaining module 610 is configured to obtain original picture information.

The indexing module 630 is configured to perform an indexing operation on the original picture information to obtain an indexed object.

The de-indexing module 650 is configured to perform an de-indexing operation on the indexed object, and establish a bitmap object of an index color format according to a color table and a pixel buffer in the indexed object.

The display module 670 is configured to display the picture content in the application by using the bitmap object.

In an embodiment, the information obtaining module 610 may include an information obtaining unit, configured to obtain specified original picture information by means of picture information construction performed in advance.

Figure 7:
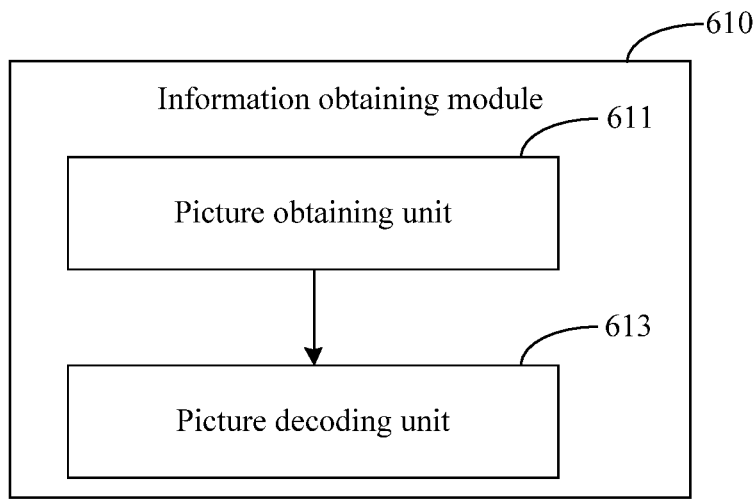
FIG. 7 is a structural block diagram of an information obtaining module in FIG. 6.

Referring to FIG. 7, in an embodiment, the information obtaining module 610 may include a picture obtaining unit 611 and a picture decoding unit 613.

The picture obtaining unit 611 is configured to obtain a picture conforming to a preset picture information format in the application.

The picture decoding unit 613 is configured to decode the picture by using a picture decoder to obtain the original picture information.

Figure 8:
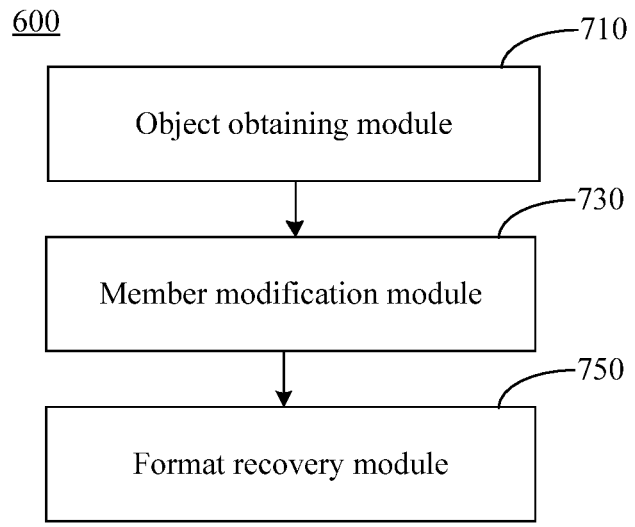
FIG. 8 is a structural block diagram of an apparatus for displaying picture content in an application according to another embodiment.

Referring to FIG. 8, in an embodiment, the foregoing apparatus 600 may further include an object obtaining module 710, a member modification module 730, and a format recovery module 750.

The object obtaining module 710 is configured to obtain a bitmap object in an editing mode by means of forcible modification of the index color format in the bitmap object when a content modification operation on the displayed picture content is triggered.

The member modification module 730 is configured to modify, in the bitmap object in an editing mode, a member related to the content modification operation, and modify the picture content by means of modification of the member.

The format recovery module 750 is configured to recover the forcible modification of the index color format in the bitmap object, and display the modified picture content.

Figure 9:
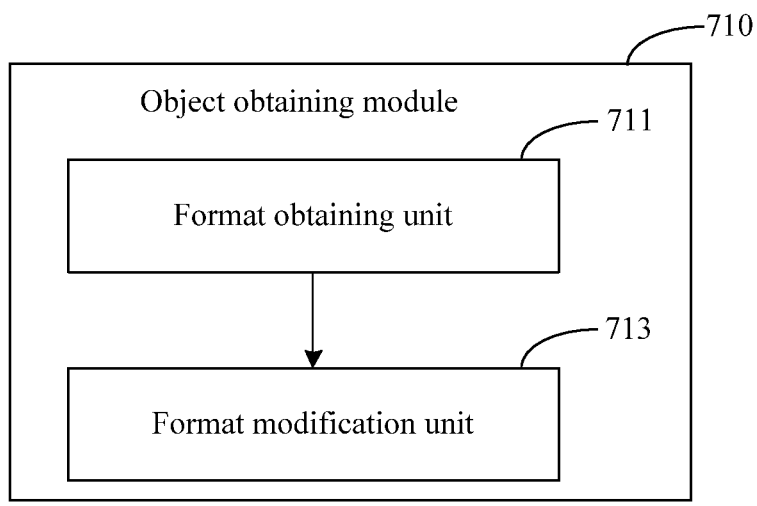
FIG. 9 is a structural block diagram of an object obtaining module in FIG. 8.

Referring to FIG. 9, in an embodiment, the object obtaining module 710 may include a format obtaining unit 711 and a format modification unit 713.

The format obtaining unit 711 is configured to when the content modification operation on the displayed picture content is triggered, access the bitmap object, and obtain a color format of the bitmap object.

The format modification unit 713 is configured to forcibly modify the color format of the bitmap object into an Alpha8 format, where the bitmap object of the Alpha8 format is in the editing mode.

In an embodiment, the content modification operation may be a color modification operation.

Further, the foregoing apparatus 600 further includes a color value modification module. When a color modification operation on the displayed picture content is triggered, the color value modification module may be configured to: modify a color value in a color table of the bitmap object, so that a match color displayed by the picture content conforms with the color modification operation.

In another embodiment, the present disclosure may include a computer readable storage medium. Optionally, in this embodiment, the storage medium may be used to store program codes or instructions for performing the method for displaying picture content in an application in embodiments of the present disclosure.

Optionally, in this embodiment, the storage medium may be located in at least one of a plurality of network devices in a mobile communications network, a wide area network, a metropolitan area network, or a local area network.

Optionally, in this embodiment, the storage medium may include but is not limited to various media that can store program codes such as a USB flash drive, a read-only memory (ROM), a random access memory (RAM), a removable hard disk, a magnetic disk, or an optical disc.

The foregoing content is merely preferred embodiments of the present disclosure, and is not intended to limit implementation of the present disclosure. A person of ordinary skill in the art may conveniently perform flexible modification according to the main concept and spirit of the present disclosure. Therefore, the protection scope of the present disclosure is subject to the appended claims.

What is claimed is:

1. A method for displaying a picture in an application, the method comprising:
    performing, by a device comprising a memory and a process in communication with the memory, a de-indexing operation on an indexed object to establish a bitmap object of an index color format according to a color table of the indexed object and a pixel buffer of the indexed object; and
    displaying, by the device, a picture in an application by using the bitmap object.

2. The method according to claim 1, further comprising:
    in response to triggering a content modification operation on the displayed picture, obtaining, by the device, the bitmap object in an editing mode by means of modification of the index color format in the bitmap object; and
    modifying, by the device, a parameter related to the content modification operation to modify the picture.

3. The method according to claim 2, further comprising:
    recovering, by the device, the modification of the index color format in the bitmap object, and displaying the modified picture.

4. The method according to claim 1, further comprising:
    in response to triggering a content modification operation on the displayed picture, accessing, by the device, the bitmap object to obtain a color format of the bitmap object; and
    modifying, by the device, the color format of the bitmap object into an Alpha8 format, wherein the bitmap object of the Alpha8 format is in an editing mode.

5. The method according to claim 1, wherein the method further comprises:
    in response to triggering a color modification operation on the displayed picture, modifying, by the device, a color value in a color table of the bitmap object to match a color according to the color modification operation.

6. The method according to claim 1, wherein the method further comprises:
    obtaining, by the device, original picture information of the picture; and
    performing, by the device, an indexing operation on the original picture information to obtain the indexed object.

7. The method according to claim 1, further comprising:
    obtaining, by the device, the picture conforming to a preset picture information format in the application; and decoding, by the device, the picture by using a picture decoder to obtain original picture information of the picture.

8. An apparatus for displaying picture in an application, comprising:
   a memory storing instructions;
   a processor in communication with the memory, wherein, when the processor executes the instructions, the processor is configured to cause the apparatus to:
      perform a de-indexing operation on an indexed object to establish a bitmap object of an index color format according to a color table of the indexed object and a pixel buffer of the indexed object; and
      display a picture in an application by using the bitmap object.

9. The apparatus according to claim 8, wherein, when the processor executes the instructions, the processor is configured to further cause the apparatus to:
   in response to triggering a content modification operation on the displayed picture, obtain the bitmap object in an editing mode by means of modification of the index color format in the bitmap object; and
   modify a parameter related to the content modification operation to modify the picture.

10. The apparatus according to claim 9, wherein, when the processor executes the instructions, the processor is configured to further cause the apparatus to:
    recover the modification of the index color format in the bitmap object, and displaying the modified picture.

11. The apparatus according to claim 8, wherein, when the processor executes the instructions, the processor is configured to further cause the apparatus to:
    in response to triggering a content modification operation on the displayed picture, access the bitmap object to obtain a color format of the bitmap object; and
    modify the color format of the bitmap object into an Alpha8 format, wherein the bitmap object of the Alpha8 format is in an editing mode.

12. The apparatus according to claim 8, wherein, when the processor executes the instructions, the processor is configured to further cause the apparatus to:
    in response to triggering a color modification operation on the displayed picture, modify a color value in a color table of the bitmap object to match a color according to the color modification operation.

13. The apparatus according to claim 8, wherein, when the processor executes the instructions, the processor is configured to further cause the apparatus to:
    obtain original picture information of the picture; and
    perform an indexing operation on the original picture information to obtain the indexed object.

14. The apparatus according to claim 8, wherein, when the processor executes the instructions, the processor is configured to further cause the apparatus to:
    obtain the picture conforming to a preset picture information format in the application; and
    decode the picture by using a picture decoder to obtain original picture information of the picture.

15. A non-transitory computer readable storage medium storing instructions, the instructions, when executed by a processor, configured to cause the processor to:
    perform a de-indexing operation on an indexed object to establish a bitmap object of an index color format according to a color table of the indexed object and a pixel buffer of the indexed object; and
    display a picture in an application by using the bitmap object.

16. The non-transitory computer readable storage medium according to claim 15, wherein the instructions, when executed by the processor, are configured to further cause the processor to:
    in response to triggering a content modification operation on the displayed picture, obtain the bitmap object in an editing mode by means of modification of the index color format in the bitmap object;
    modify a parameter related to the content modification operation to modify the picture; and
    recover the modification of the index color format in the bitmap object, and displaying the modified picture.

17. The non-transitory computer readable storage medium according to claim 15, wherein the instructions, when executed by the processor, are configured to further cause the processor to:
    in response to triggering a content modification operation on the displayed picture, access the bitmap object to obtain a color format of the bitmap object; and
    modify the color format of the bitmap object into an Alpha8 format, wherein the bitmap object of the Alpha8 format is in an editing mode.

18. The non-transitory computer readable storage medium according to claim 15, wherein the instructions, when executed by the processor, are configured to further cause the processor to:
    in response to triggering a color modification operation on the displayed picture, modify a color value in a color table of the bitmap object to match a color according to the color modification operation.

19. The non-transitory computer readable storage medium according to claim 15, wherein the instructions, when executed by the processor, are configured to further cause the processor to:
    obtain original picture information of the picture; and
    perform an indexing operation on the original picture information to obtain the indexed object.

20. The non-transitory computer readable storage medium according to claim 15, wherein the instructions, when executed by the processor, are configured to further cause the processor to:
    obtain the picture conforming to a preset picture information format in the application; and
    decode the picture by using a picture decoder to obtain original picture information of the picture.

* * * * *